A. J. ANDERSON.
ATTACHMENT FOR PLANTERS.
APPLICATION FILED DEC. 12, 1910.

984,731.

Patented Feb. 21, 1911.

Witnesses:
E. C. Skinkle
Harry Opsahl,

Inventor:
A. J. Anderson,
By his Attorneys,
Williamson Merchant

UNITED STATES PATENT OFFICE.

ADOLPH J. ANDERSON, OF HOUSTON, MINNESOTA.

ATTACHMENT FOR PLANTERS.

984,731.  Specification of Letters Patent.  Patented Feb. 21, 1911.

Application filed December 12, 1910. Serial No. 596,824.

*To all whom it may concern:*

Be it known that I, ADOLPH J. ANDERSON, a citizen of the United States, residing at Houston, in the county of Houston and State of Minnesota, have invented certain new and useful Improvements in Attachments for Planters; and I do hereby declare the following to be a full, clear, and exact description of the invention, such as will enable others skilled in the art to which it appertains to make and use the same.

My invention relates to planters and has for its especial object to provide an attachment therefor for coöperation with the furrow opener.

The purpose of the improved attachment is to smooth the furrow as it is opened up by the furrow opening blade, to brush aside all obstacles such as stones, sod and corn stalks, and to regulate the depth of the furrow to insure the planting of a drop seed at a proper and uniform depth.

Particularly, my invention is in the nature of an improvement on my prior U. S. patent entitled "Corn planter," No. 941,485, issued of date November 30, 1909, and provides a better means for adjustably and detachably connecting the so-called shoe wings to the furrow opener.

To the above ends, the invention consists of the novel devices and combinations of devices hereinafter described and defined in the claims.

In the accompanying drawings which illustrate the invention, like characters indicate like parts throughout the several views.

Figure 1:
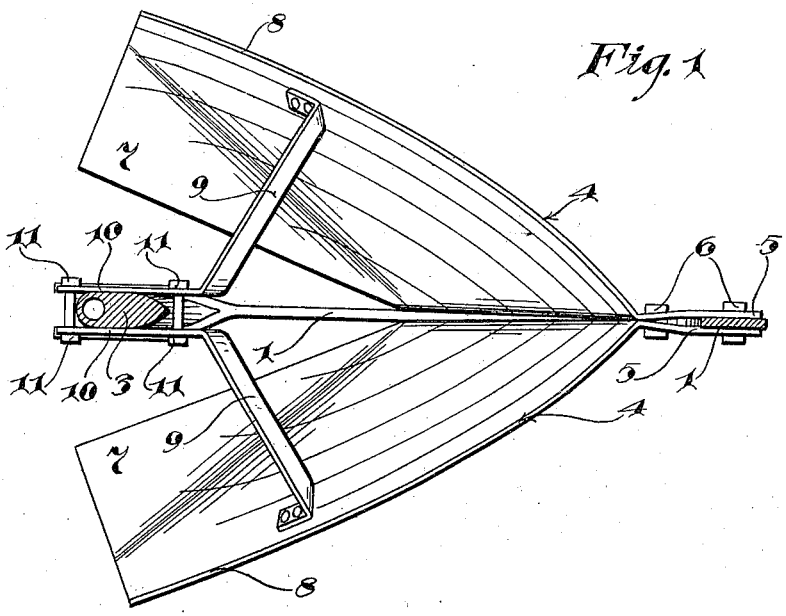
Figure 2:
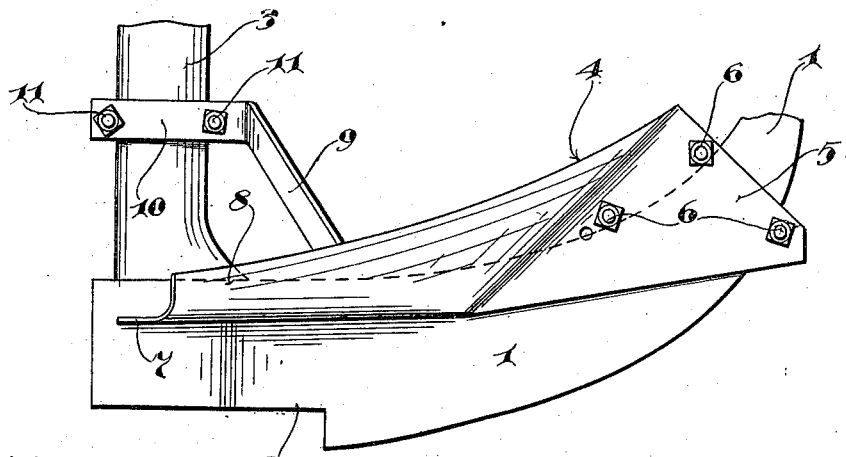

Referring to the drawings, Figure 1 is a plan view of the improved attachment applied in working position to the furrow opening blade and seed boot of the planter, some parts of which are shown in section; and Fig. 2 is a view in side elevation of the parts shown in Fig. 1.

The planter shoe comprises a forwardly and upwardly curved furrow opening blade 1 cut away at the rear end portion of its cutting surface, as indicated by the numeral 2. Rigidly secured to the rear upper surface of the furrow opening blade 1, directly over the cut away portion 2, is an upwardly extended seed boot 3. The furrow opening blade 1 and the seed boot 3, in actual practice, will be secured in any suitable way to a supporting frame, not shown.

The parts thus far described may be of the standard or any suitable construction.

The improved attachment is in the form of a pair of shoe wings 4 terminating at their front ends in flat parallel and vertically extended portions 5 which embrace the forwardly upturned portion of the furrow opening blade 1. Nutted bolts 6 are passed through the flat portions 5 of the shoe wings 4, both to the rear and front of the adjacent portion of the furrow opening blade 1, for rigidly and adjustably clamping the shoe wings 4 onto the furrow opening blade 1. At their rear ends, the shoe wings 4 terminate in rearwardly diverging flat surfaces 7, the outer edges of which are curved upward to form vertically extended side flanges 8 which extend to, and converge toward, the front upper ends of the shoe wings 4. As shown, the rear end portions of the shoe wings 4 are adjustably and detachably connected to the seed boot 3, by means of a pair of upwardly and rearwardly converging brace rods 9 rigidly secured at their lower ends to the intermediate portions of the side flanges 8 of the shoe wings 4 and have their upper ends bent at 10 into horizontal parallel arrangement to embrace the seed boot 3. Nutted bolts 11 are passed through the ends 10 of the brace rods 9 on both the front and rear sides of the seed boot 3 and rigidly and adjustably secure the side wings 4 to the seed boot 3.

The flat surfaces 7 of the side wings 4 tend to smooth the earth on either side of the furrow as it is opened up by the furrow opening blade 1, to fill all slight depressions, such as tracks made by the hoofs of the draft animals, to regulate the depth of the furrow, to insure the planting of the drop seed at a uniform depth and the proper covering of the same. The side flanges 8 of the side wings 4 brush away, under the advance movement of the planter, all obstacles such as stones, sod, and corn stalks which would interfere with the proper planting of the seed.

In some instances, the brace rods 9 may be done away with and the shoe wings 4 connected only at their forward end. In such instance, the shoe wings 4 would necessarily have to be made of a somewhat more heavy and rigid material. In actual practice, it has been found that the best results are obtained in securing the shoe wings 4 to the furrow opening blade 1, at a slight angle to the horizontal, as clearly shown in Fig. 2.

As is evident, from the above description, by loosening the nutted bolts 6 and 11, the shoe wings 4 may be very quickly raised or lowered with respect to the planter, to vary the depth of the furrow or to change the angularity of the side wings with respect to the horizontal, to meet various conditions of the soil.

What I claim is:

1. In a planter, the combination with a furrow opener having a forwardly extended upturned portion, of a pair of shoe wings having flat portions embracing the sides of the upturned portion of said furrow opener, and nutted bolts passed through the flat portions of said shoe wings at the front and rear of the upturned portion of said furrow opener for rigidly and adjustably connecting the said shoe wings to said furrow opener, substantially as described.

2. In a planter, the combination with a furrow opener and a seed boot rigidly secured thereto, said furrow opener having a forwardly extended upturned portion, of a pair of shoe wings terminating at their forward ends in flat portions embracing the sides of the upturned portion of said furrow opener, and terminating at their rear ends in flat diverging horizontal portions with the outer edges thereof bent upward into vertical positions and extending to the front upper ends of said shoe wings, nutted bolts passed through the flat portions of said shoe wings at the front and rear of the upturned portion of said furrow opener, a pair of brace rods rigidly secured, one to each of said shoe wings, and embracing said seed boot, and nutted bolts passed through said brace rods to the front and rear of said seed boot, and the nutted bolt in said shoe wings and brace rods rigidly and adjustably connecting said shoe wings to said furrow opener and seed boot, substantially as described.

In testimony whereof I affix my signature in presence of two witnesses.

ADOLPH J. ANDERSON.

Witnesses:
ALICE V. SWANSON,
HARRY D. KILGORE.